United States Patent [19]

Finnell et al.

[11] Patent Number: 5,577,227
[45] Date of Patent: Nov. 19, 1996

[54] METHOD FOR DECREASING PENALTY RESULTING FROM A CACHE MISS IN MULTI-LEVEL CACHE SYSTEM

[76] Inventors: James S. Finnell, 4920 Englewood Dr., San Jose, Calif. 95129; Dean A. Mulla, 985 Hibiscus La., San Jose, Calif. 95117

[21] Appl. No.: 286,121

[22] Filed: Aug. 4, 1994

[51] Int. Cl.⁶ .................................................. G06F 12/08
[52] U.S. Cl. ......................... 395/449; 395/464; 395/471; 395/495
[58] Field of Search ..................................... 395/403, 444, 395/445, 449, 447, 450, 452, 453, 460, 461, 463, 464, 495, 421.03, 471

[56] References Cited

U.S. PATENT DOCUMENTS

| | | | |
|---|---|---|---|
| 4,463,420 | 7/1984 | Fletcher | 395/463 |
| 4,464,712 | 7/1984 | Fletcher | 395/449 |
| 4,722,047 | 1/1988 | Chan et al. | 395/412 |
| 4,774,654 | 9/1988 | Pomerence et al. | 395/449 |
| 4,823,259 | 4/1989 | Aichelmann, Jr. et al. | 395/449 |
| 4,972,316 | 11/1990 | Dixon et al. | 395/440 |
| 5,136,700 | 8/1992 | Thacker | 395/449 |
| 5,214,765 | 5/1993 | Jensen | 395/449 |
| 5,249,282 | 9/1993 | Segers | 395/449 |
| 5,285,323 | 2/1994 | Hetherington et al. | 395/449 |
| 5,307,477 | 4/1994 | Taylor et al. | 395/449 |
| 5,361,391 | 11/1994 | Westberg | 395/464 |

OTHER PUBLICATIONS

J. L. Baer, W. H. Wang, *Multilevel Cache Hierarchies: Organizations, Protocols and Performance*, Journal of Parallel Distributed Computing, vol. 6, 1989, pp. 451–476.

W. H. Wang, J. L. Baer and H. Levy, *Organization and Performance of a Two–Level Virtual–Real Cache Hierarchy*, Proceedings of the 16th Annual International Symposium on Computer Architecture, 1989, pp. 140–148.

J. L. Baer, W. H. Wang, *On the Inclusion Properties for Multi–Level Cache Hierarchies*, Proceedings of the 15th Annual International Symposium on Computer Architecture, 1988, pp. 73–80.

*Primary Examiner*—Eddie P. Chan
*Assistant Examiner*—Hiep T. Nguyen

[57] ABSTRACT

A computing system includes a processor, a main memory, a first level cache and a second level cache. The second level cache contains data lines. The first level cache contains data line fragments of data lines within the second level cache. In response to a processor attempt to access a data word, a cache controller searches for the data word in the first level cache. When a first level cache miss results from the attempted access, a search is made for the data word in the second level cache. When a second level cache miss results a new data line, which contains the data word, is fetched from the main memory. Concurrently, the cache controller determines which entries of the first level cache are invalid. Once the new data line is fetched from the main memory, the new data line is placed in the second level cache, replacing the second level victim cache line. In addition, as many data line fragments as possible from the new data line are placed into invalid entries in the first level cache. One of data line fragments from the new data line placed into the first level cache includes the data word.

12 Claims, 11 Drawing Sheets

METHOD FOR DECREASING PENALTY RESULTING FROM A CACHE MISS IN MULTI-LEVEL CACHE SYSTEM

BACKGROUND

The present invention concerns a method for handling a cache miss in a multi-level cache system.

Most modern computer systems include a central processing unit (CPU) and a main memory. The speed at which the CPU can decode and execute instructions and operands depends upon the rate at which the instructions and operands can be transferred from main memory to the CPU. In an attempt to reduce the time required for the CPU to obtain instructions and operands from main memory, many computer systems include a cache memory between the CPU and main memory.

A cache memory is a small, high-speed buffer memory which is used to hold temporarily those portions of the contents of main memory which it is believed will be used in the near future by the CPU. The main purpose of a cache is to shorten the time necessary to perform memory accesses, either for data or instruction fetch. The information located in cache memory may be accessed in much less time than information located in main memory. Thus, a CPU with a cache memory needs to spend far less time waiting for instructions and operands to be fetched and/or stored.

A cache memory is made up of many blocks (also called lines) of one or more words of data. Each block has associated with it an address tag that uniquely identifies which block of main memory it is a copy of. Each time the processor makes a memory reference, an address tag comparison is made to see if a copy of the requested data resides in the cache. If the desired memory block is not in the cache, the block is retrieved from the main memory, stored in the cache and supplied to the processor. When a new cacheline X is to be brought into a cache, if there is already another cacheline Y in the target cache entry, that resident cacheline Y becomes a "victim cacheline." To make room for the new cacheline X, the victim cacheline Y must be removed from the cache. If the victim cacheline Y has been modified since it was brought into the cache it is called "dirty" and it must be written back to main memory; if it has not been modified it is called "clean" and it may simply be discarded. In a two-level cache system, there can be "level one victim cache lines" and "level two victim cache lines."

In addition to using a cache to retrieve data from main memory, the CPU may also write data into the cache instead of directly to the main memory. When the processor desires to write data to the memory, the cache makes an address tag comparison to see if the data block into which data is to be written resides in the cache. If the data block exists in the cache, the data is written into the data block in the cache and a data "dirty bit" for the data block is set. The dirty bit indicates that data in the data block has been modified, and thus before the data block is deleted from the cache the modified data must be written back into main memory. If the data block into which data is to be written does not exist in the cache, the data block must be fetched into the cache or the data written directly into the main memory.

In some applications two cache memories are used. A first level cache memory typically has a subset of the data in a second level cache memory. Similarly, the second level cache memory typically has a subset of the data in the main memory. Generally, the first level cache is small in size relative to the second level cache. The first level cache has a fast access time which is typically one processor cycle. The second level cache has a somewhat slower access time of, for example, two to three cycles. The second level cacheline size is an optimized tradeoff between memory access overhead (which improves with larger line sizes) and trying to avoid wasting cycles by fetching data that is never used. Typically, the second level cacheline size is two to sixteen words. The first level cacheline size typically ranges from one word to the size of the cacheline for the second level cache.

Accessed data is first searched for in the first level cache memory. If there is a miss in the first level cache memory, the accessed data is searched for in the second level cache memory. If there is a miss in the second level cache memory, the data is fetched from the main memory.

In one arrangement of a two level cache for a processor system, the first level cache is a full subset of the second level cache. It is also smaller and closer to the processor than a second level cache. Because it is smaller and closer to the processor, a first level cache can, in general, offer improved performance because it has a smaller access latency than its companion second level cache or that of memory.

In normal operation there are several different actions that may be necessary to satisfy some memory reference. A memory reference is generally a load or store instruction. First, simplest, and fastest, the reference might hit in the first level cache. A hit is defined as when the data for a desired memory address is present in the cache being checked (first level or second level). A miss is defined to be a memory reference where the data for a desired memory address is not present in the cache being checked (first level or second level). When there is a hit in the first level cache, there is a zero cycle penalty, and the reference is completed without a processing penalty.

The next fastest case is a first level cache miss that happens to hit in the second level cache. This causes a sequence of operations to be performed to fill a single first level cache line with data from the second level cache. Data is subsequently supplied to the processor or the store completes. This is a medium speed operation, and the processor will be frozen while it waits for the memory reference to be satisfied.

The slowest operation is when the memory reference misses both the first level and second level caches. In this instance, a long sequence of operations is initiated to bring the relevant line from main memory into the second level cache. When this data is returned from memory and copied into the second level cache, the first level cache is again referenced, resulting, this time, in a first level cache miss that now hits in the second level cache. This causes the relevant portion of the second level cache line to be written into the first level cache, and subsequently the requested data is supplied to the processor, or the store completes.

One extension is to fill the addressed first level cache line at the same time as the second level cache line is being written. This avoids the penalty of the first level cache miss and only has the performance penalty of the second level cache miss. For general information on multilevel cache systems, see for example: J. L. Baer, W. H. Wang, *Multilevel Cache Hierarchies-Organizations, Protocols and Performance, Journal of Parallel Distributed Computing*, Vol. 6, 1989, pp. 451–476; W. H. Wang, J. L. Baer and H. Levy, *Organization and Performance of a Two-Level Virtual-Real Cache Hierarchy, Proceedings of the* 16th Annual International Symposium on Computer Architecture, 1989, pp. 140–148; and J. L. Baer, W. H. Wang, *On the Inclusion*

*Properties for Multi-Level Cache Hierarchies, Proceedings of the 15th Annual International Symposium on Computer Architecture*, 1988, pp. 73–80.

SUMMARY OF THE INVENTION

In accordance with the preferred embodiment of the present invention, a computing system includes a processor, a main memory, a first level cache and a second level cache. The second level cache contains data lines. The first level cache contains data line fragments of data lines within the second level cache. In the preferred embodiment, the size of the data lines stored in the second level cache is sixty-four bytes (sixteen words) and the size of the data line fragments stored in the first level cache is sixteen bytes (four words). In response to a processor attempt to access a data word, a cache controller searches for the data word in the first level cache. When a first level cache miss results from the attempted access, a search is made for the data word in the second level cache. When a second level cache miss results, a new data line, which contains the data word being referenced, is fetched from the main memory. Concurrently, the cache controller determines which entries of the first level cache that are mapped to by the new memory data line are invalid.

In the preferred embodiment, invalid entries include entries of the first level cache which were previously marked invalid, for example by purges, flushes or multiprocessor snoops, and entries within the first level cache which contained cache line fragments from a level two victim cache line. A level two victim cache line is the cache line within the second level cache that will be replaced by a new line of data fetched in from the main memory. Once the new data line is fetched from the main memory, the new data line is placed in the second level cache, replacing the level two victim cache line. In addition, as many data line fragments as possible from the new data line are placed into invalid entries in the first level cache. One of the data line fragments from the new data line placed into the first level cache will include the data word currently being referenced.

The preferred embodiment of the present invention statistically decreases the cache miss penalty for memory references in a computer processor with a multi-level cache system. This decrease occurs because future cache misses are being taken care of during a single cache miss.

DESCRIPTION OF THE PREFERRED EMBODIMENT

Figure 1:
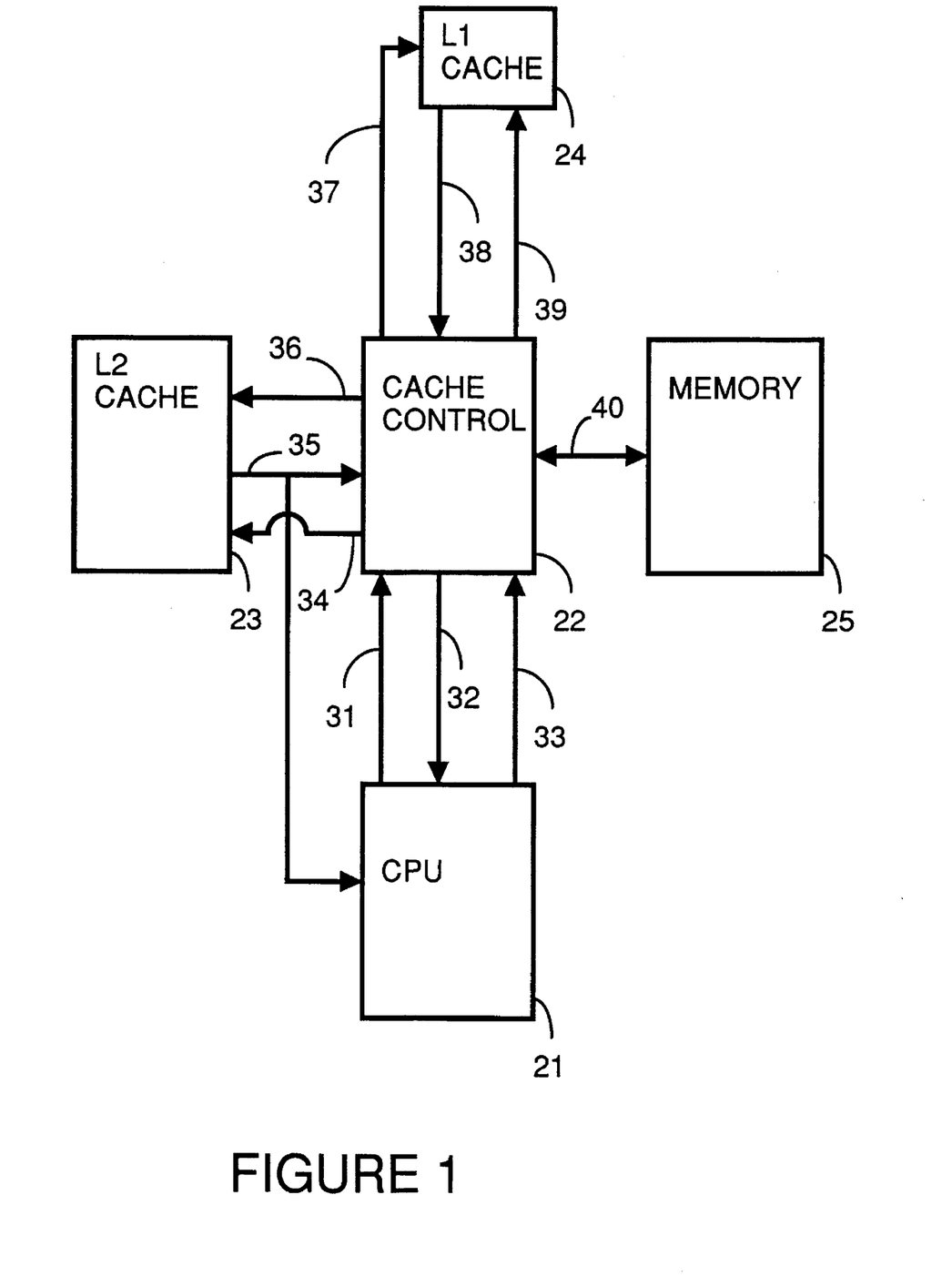
FIG. 1 shows a simplified block diagram of a processor system with a multi-level cache, in accordance with a preferred embodiment of the present invention.

FIG. 1 shows a simplified block diagram of a processor system with a multi-level cache, in accordance with a preferred embodiment of the present invention. Shown is a central processing unit (CPU) 21 which executes instructions for the processing system. A main memory 25 provides storage for the processing system. In the preferred embodiment each data word includes four bytes. A two-level cache system includes a first level cache 24 and a second level cache 23.

In the preferred embodiment first level cache 24 is a small, fast, direct-mapped cache with a small cache line size (4 words). First level cache 24 contains subset of a second level cache 23. Each valid entry within first level cache 24 contains a four word fragment of a valid cache line within second level cache 23. In the preferred embodiment, there is no write through from first level cache 24 to second level cache 23. That is, in response to a store instruction, data may be stored first level cache 24, but not written through to second level cache 23. Thus first level cache 24 may have more up-to-date data than second level cache 23. Second level cache is a larger, slower, direct-mapped cache with a larger cache line size of sixteen words.

Cache control logic 22 accesses first level cache 24 and second level cache 23 for CPU 21 and coordinates data transfers between memory 25, first level cache 24, and second level cache 23. Data access between cache control logic 22 and memory 25 is performed using memory data lines 40. CPU 21 forwards data addresses to cache control logic 22 and first level cache 24 using address lines 31 and first level address lines 37. CPU 21 forwards data to be stored to cache control logic 22 using store data lines 33. CPU 21 receives load data through first level load data lines 32.

CPU 21 forwards data addresses to cache control logic 22 and second level cache 23 using address lines 31 and second level address lines 34. CPU 21 receives load data from second level cache 23 through second level data out lines 35. Second level cache 23 receives data through second level data in lines 36. First level cache 24 receives data through first level data in lines 39. First level cache 24 forwards data to cache control logic 22 through first level data out lines 38.

FIG. 2, FIG. 3, FIG. 4, FIG. 5 and FIG. 6 illustrate data flow through the processor shown in FIG. 1 resulting from memory references in accordance with preferred embodiments of the present invention.

Figure 2:
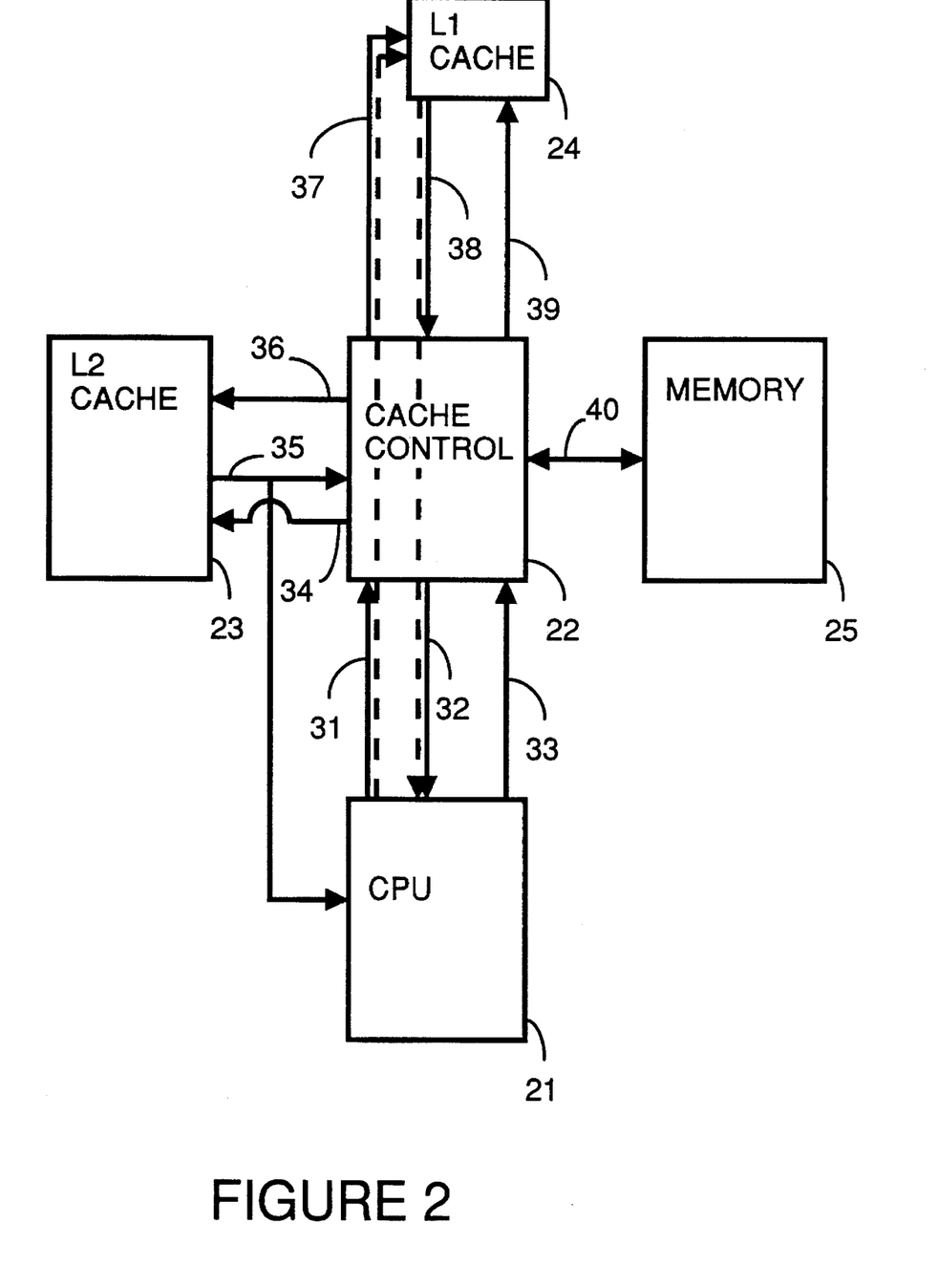
FIG. 2, FIG. 3, FIG. 4, FIG. 5 and FIG. 6 illustrate data flow through the processor shown in FIG. 1 resulting from memory references in accordance with preferred embodiments of the present invention.

The dotted lines in FIG. 2 illustrate data flow when there is a memory reference for a load which results in a hit in first level cache 24. As illustrated, CPU 21 sends an address to cache control logic 22 on address lines 31 which cache control 22 forwards to first level address lines 37 and on to first level cache 24. The data that is read from first level cache 24 is sent to cache control logic 22 on first level data out lines 38 and forwarded to CPU 21 on first level load data lines 32 to complete the load request.

Figure 3:
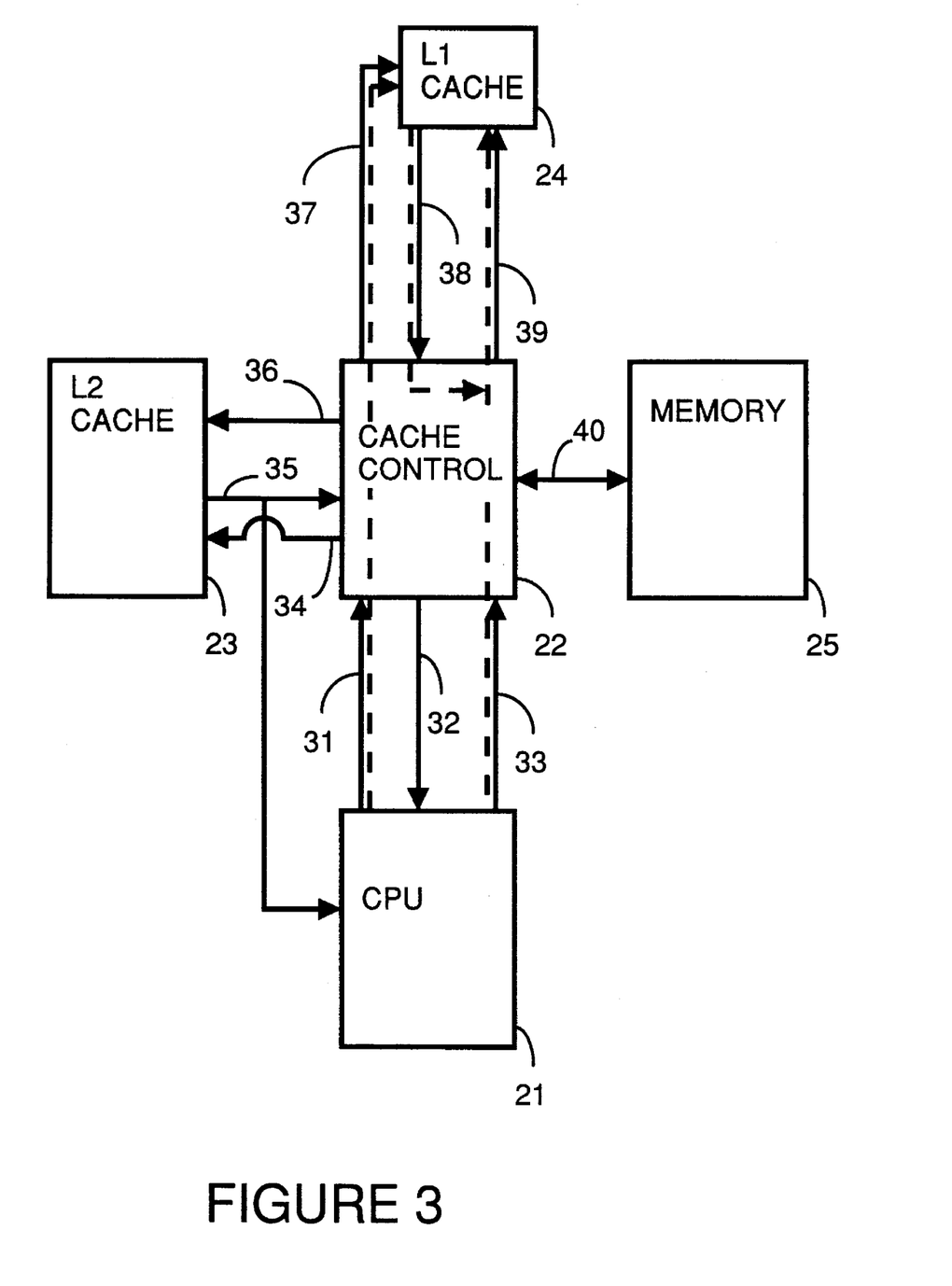

The dotted lines in FIG. 3 illustrate data flow when there is a memory reference for a store which results in a hit in first level cache 24. As illustrated, CPU 21 sends an address to cache control logic 22 on address lines 31. CPU 21 also sends store data to cache control logic 22 on store data lines 33. Cache control 22 places an address on first level address lines 37 and on to first level cache 24. First level cache 24 returns to cache control logic 22 on the first level data out lines 38, the current contents of first level cache 24 at the address. Depending upon what the type of store instruction is involved, cache control 22 selectively merges the data returned from first level cache 24 with the store data from CPU 21. The merged data is written to first level cache 24 using first level data in lines 39 to complete the store request.

Figure 4:
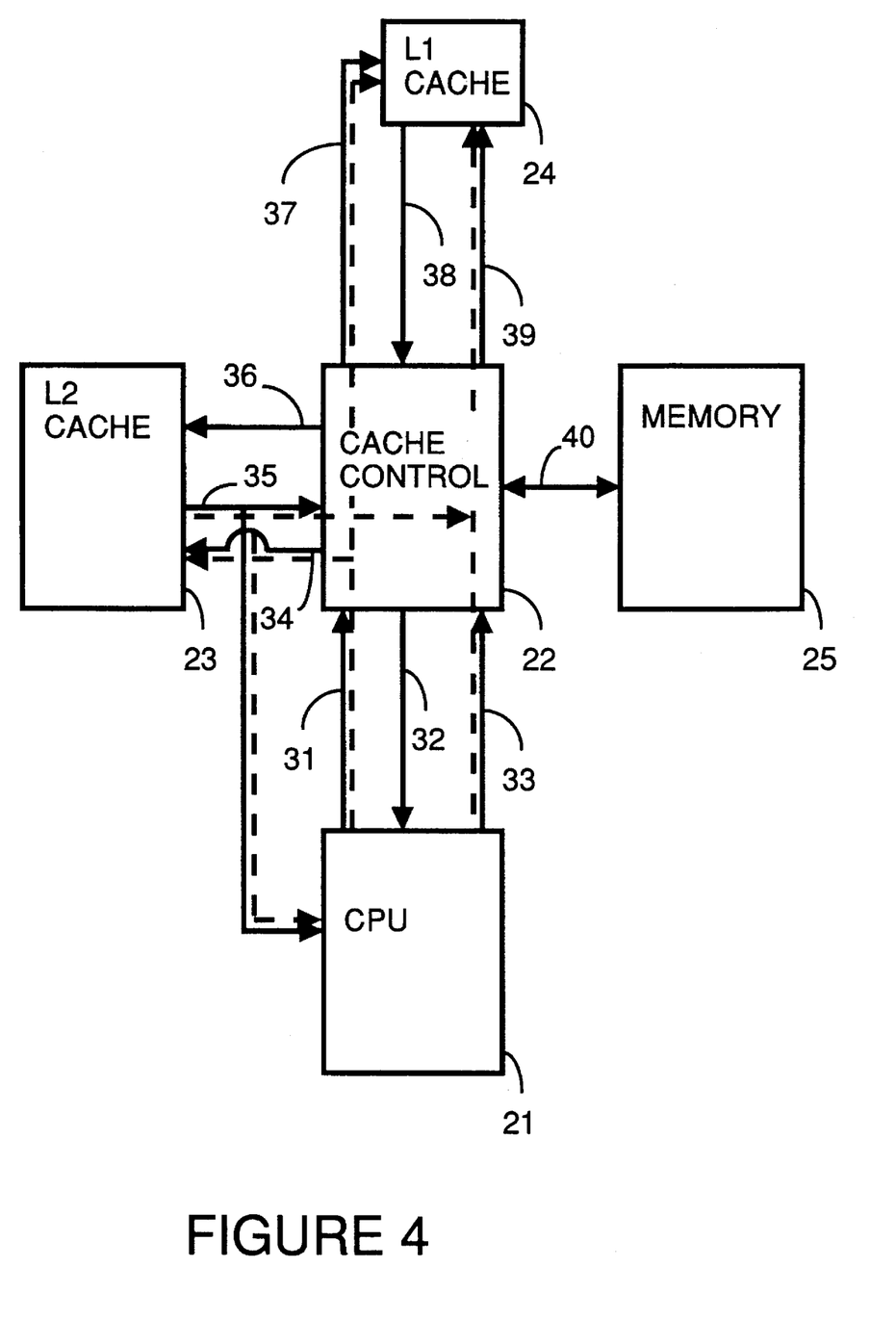

The dotted lines in FIG. 4 illustrate data flow when there is a memory reference for a store or load which results in a clean miss in first level cache 24 and results in a hit in second level cache 23. A clean miss occurs when accessed data in first level cache 24 is not part of the requested cache line and has not been modified, and thus the data may be deleted from first level cache 24 to make room for the requested cache line without writing modified data into second level cache 23 or into main memory 25. When an address tag comparison indicates that a required data block is not in first level cache 24, second level cache 23 is checked. If the corresponding data block in first level cache 24 is not dirty, and there is a hit in second level cache 23, the corresponding data block in first level cache 24 is simply invalidated and overwritten with data from second level cache 23. To access second level cache 23, CPU 21 drives address lines 31 to cache logic 22 which drives the second level address lines 34. In response, second level cache 23 returns data on the second level data out lines 35. Cache control logic 22 also drives the address to first level cache 24 on first level address lines 37. The data from second level cache 23 is then written through cache control logic 22 into first level cache 24 using second level data out lines 35 and first level data in lines 39. For a store instruction, cache control logic 22 merges the store data from CPU 21 with the data from CPU 21 when the data is written to first level cache 24. For a load instruction, CPU 21 obtains the load data directly from second level cache 23 on the second level data out lines 35.

Figure 5:
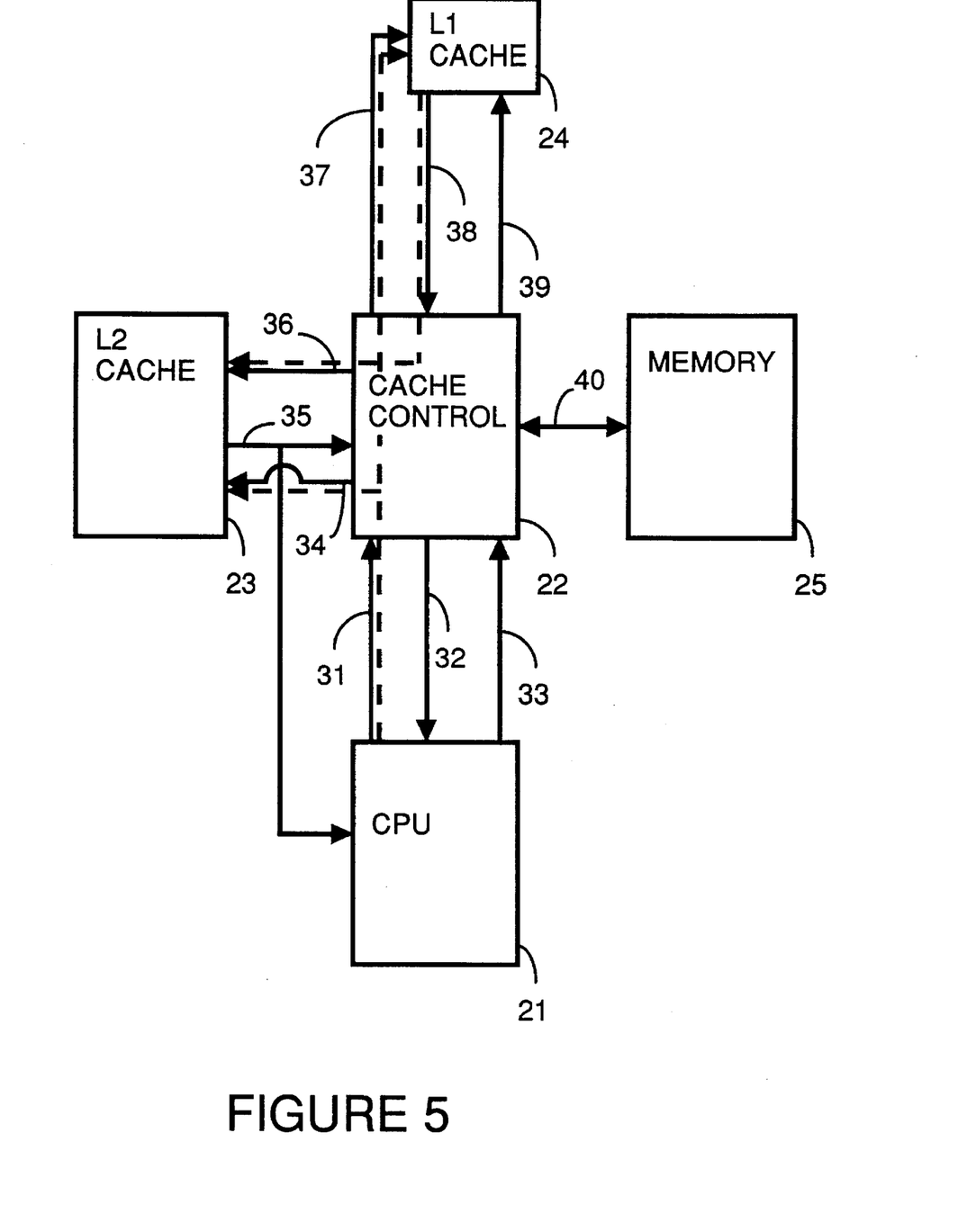
Figure 6:
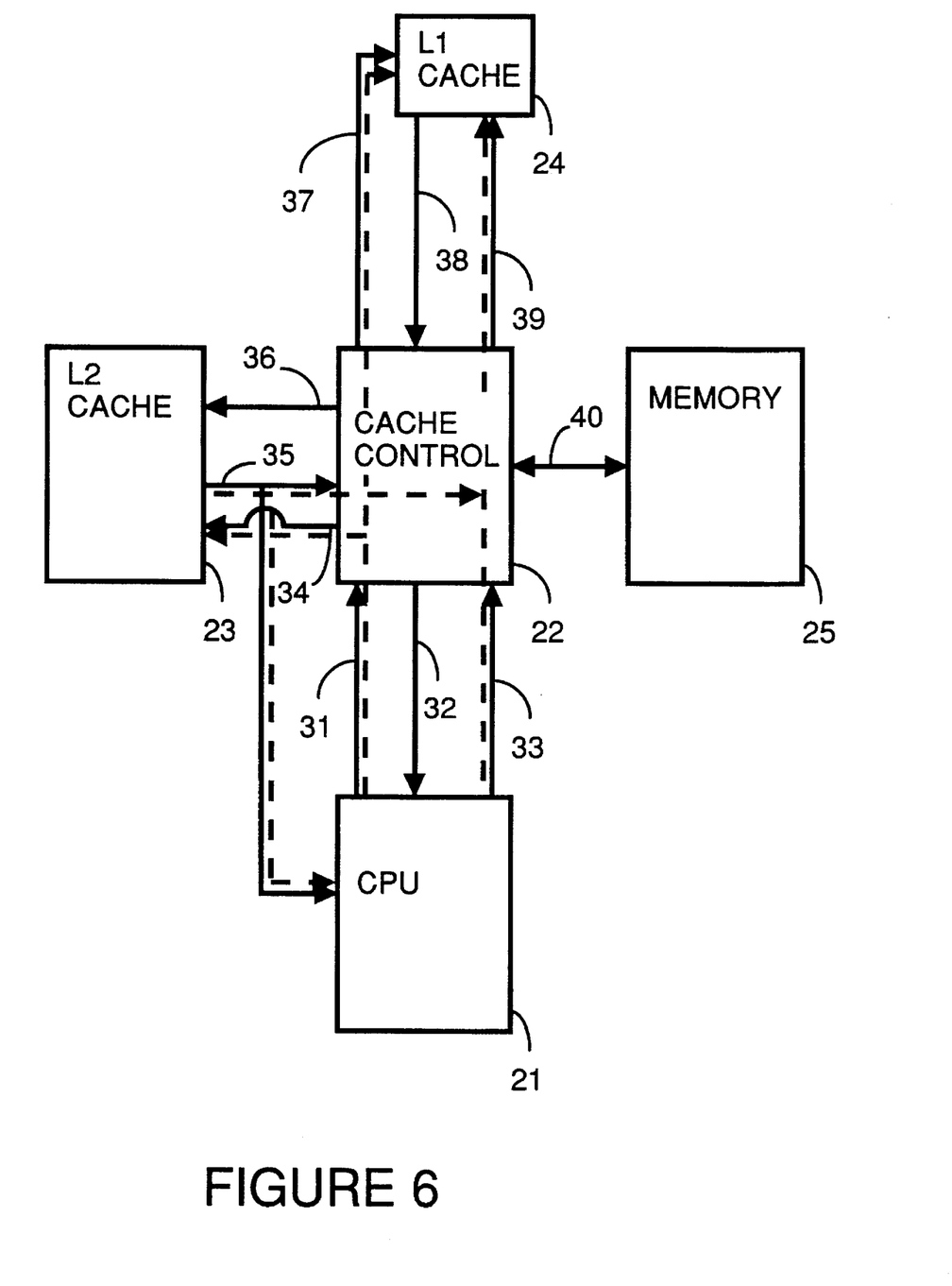

The dotted lines in FIG. 5 and FIG. 6 illustrate data flow when there is a memory reference for a store or load which results in a dirty miss in first level cache 24 and results in a hit in second level cache 23. A dirty miss occurs when accessed data in first level cache 24, while not part of the requested cache line, has been modified, and thus the data may not be deleted from first level cache 24 without writing modified data into second level cache 23 or into main memory 25. When an address tag comparison indicates that a required data block is not in first level cache 24, second level cache 23 is checked. If the corresponding data block in first level cache 24 is dirty, and there is a hit in second level cache 23, the corresponding data block in first level cache 24 is written into second level cache 23. This is illustrated by FIG. 5. There CPU 21 sends the address to cache control logic 22 on address lines 31. Cache control logic 22 drives the address to first level cache 24 on first level address lines 37. CPU 21 also drives the second level address lines 34. The data from first level cache 24 is then written through cache control logic 22 into second level cache 23 using first level data out lines 38 and second level data in lines 36.

Once the write back of dirty data is complete, the reference continues as for a clean miss in first level cache 24. As shown in FIG. 6, to access second level cache 23, CPU 21 drives address lines 31 to cache control 22 which drives second level address lines 34. In response, second level cache returns data on second level data out lines 35. Cache control logic 22 also drives the address to first level cache 24 on first level address lines 37. The data from second level cache 23 is then written through cache control logic 22 into first level cache 24 using second level data out lines 35 and first level data in lines 39. For a store instruction, cache control logic 22 merges the store data from CPU 21 with the data from CPU 21 when the data is written to first level cache 24. For a lead instruction, CPU 21 obtains the lead data directly from second level cache 23 on the second level data out lines 35.

When there is a miss at both first level cache 24 and second level cache 23, the data must be brought in from main memory 25. If there is a dirty miss at first level cache 24, the dirty data is written back to second level cache 23 as described above. When there is a dirty miss at second level cache 23, i.e., when any part of the second level victim cache line is dirty, the entire cache line must be written back to main memory 25 through a second level copy out operation. The second level victim cache line is the cache line within second level cache 23 that will be replaced by a new line of data fetched in from main memory 25. During the time the second level copy out is being performed, any first level or second level cache entries that hold portions of the second level victim cache line are invalidated. Once the second level copy out operation is complete, data is read from main memory 25 and written into second level cache 23.

As will be further described below, in the preferred embodiment of the present invention, when data is fetched from main memory 25, in addition to filling the requested sixteen byte line in first level cache 24, up to three other first level cache lines are also filled in first level cache 24. These other three cache lines are not currently referenced, but due to the statistical locality of cache references, will with high probability be referenced by future instructions before they are replaced due to some other cache miss.

FIG. 7, FIG. 8, FIG. 9 and FIG. 10 illustrate various schemes to handle filling a first level cache after a miss in the second level cache in accordance with a preferred embodiment of the present invention.

Figure 7:
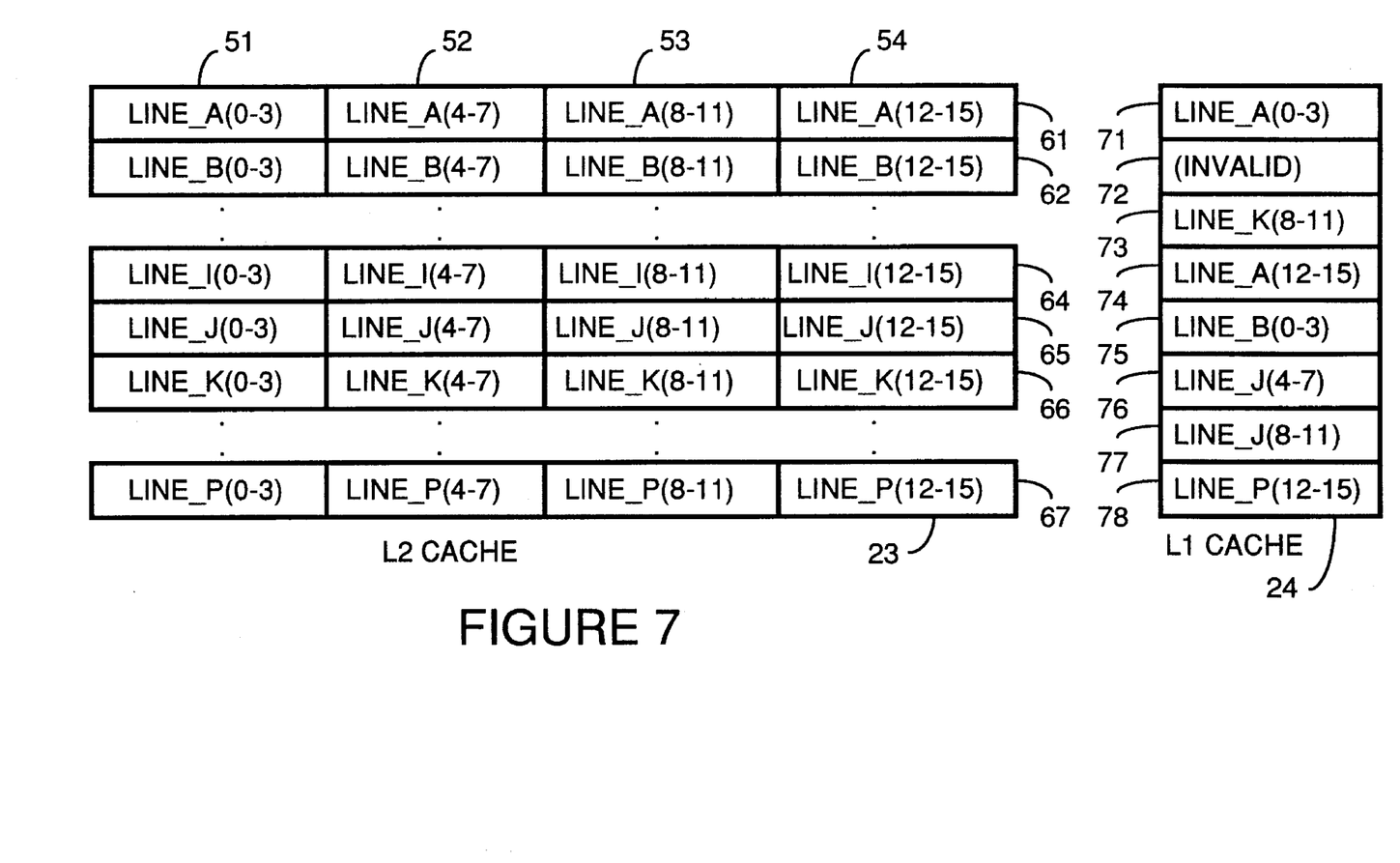
FIG. 7, FIG. 8, FIG. 9 and FIG. 10 illustrate various schemes to handle filling a first level cache after a miss in the second level cache.

Cache lines in second level cache 23 and first level cache 24 are shown in FIG. 7. Second level cache 23 includes 16 cache lines. FIG. 7 shows cache lines 61, 62, 64, 65, 66 and 67 of the sixteen cache lines. Each cache line includes sixteen words of data. In FIG. 7, the sixteen word cache lines are shown organized into four four-word line fragments. For each cache line, a first column 51 contains cache line words 0 through 3. A second column 52 contains cache line words 4 through 7. A third column 53 contains cache line words 8 through 11. A fourth column 54 contains cache line words 12 through 15. First level cache 24 includes eight four-word line fragments. Each four-word line fragment maps to a specific second level cache entry. FIG. 7 shows line fragments 71, 72, 73, 74, 75, 76, 77 and 78. In the preferred embodiment, second level cache 23 and first level cache 24 are direct mapped. Each second level cache line is depicted as four four-word fragments. Each of the four four-word fragments maps to a specific first level cache entry.

In FIG. 7, a sixteen-word cache line A is shown to reside in second level cache entry 61 of second level cache 23. A sixteen-word cache line B is shown to reside in second level cache entry 62 of second level cache 23. A sixteen-word cache line I is shown to reside in second level cache entry 64 of second level cache 23. A sixteen-word cache line J is shown to reside in second level cache entry 65 of second level cache 23. A sixteen-word cache line K is shown to reside in second level cache entry 66 of second level cache 23. A sixteen-word cache line P is shown to reside in second level cache entry 67 of second level cache 23.

Likewise, the first four words of sixteen-word cache line A reside in a first level cache entry 71 of first level cache 24. The words eight through eleven of sixteen-word cache line K reside in a first level cache entry 73 of first level cache 24. The last four words of sixteen-word cache line A reside in a first level cache entry 74 of first level cache 24. The first four words of sixteen-word cache line B reside in a first level cache entry 75 of first level cache 24. The words four through seven of sixteen-word cache line J reside in a first level cache entry 76 of first level cache 24. The words eight through eleven of sixteen-word cache line J reside in a first level cache entry 77 of first level cache 24. The last four words of sixteen-word cache line P reside in a first level cache entry 78 of first level cache 24.

The entry in a first level cache entry 72 of first level cache 24 is marked invalid. Cache lines can be invalidated through several means such as purge or flush instructions or multi-processor snoops.

When a miss occurs for both first level cache 24 and second level cache 23, a new line is brought into second level cache 23 and the appropriate four word line fragment is written in first level cache 24.

For example, suppose CPU 21 needs to access the second word of line Q which resides in main memory 25 but is not resident in first level cache 24 or second level cache 23. Further, suppose line Q maps to the same first level and second level cache entries as line A.

Figure 8:
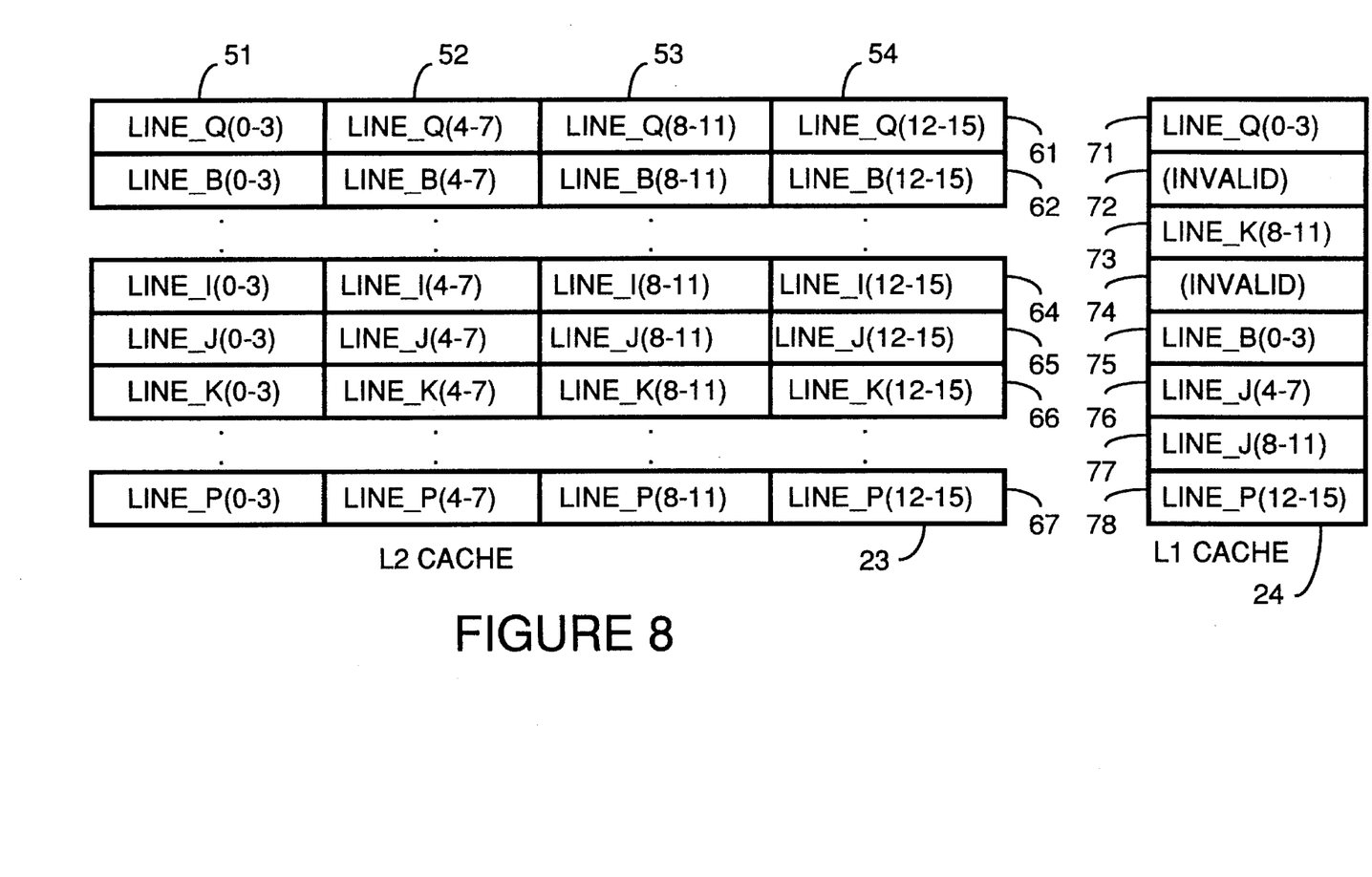

In one method of writing line Q into second level cache 23 and writing the appropriate four-word fragment into first level cache 24, line A is first written back to main memory 25 when line A is dirty. Next, all first level and second level cache entries that held portions of line A are invalidated. In this case, second level cache entry 61, first level cache entry 71 and first level cache entry 74 are invalidated. Then line Q is brought in from main memory 25 and written into second level cache entry 61 in second level cache 23. Finally, the first four-word fragment of line Q is read out of second level cache 23 and written into first level cache entry 71 of first level cache 24. The result is shown in FIG. 8.

The above method may be varied by placing the appropriate four-word fragment of line Q directly into first level cache 24 as it is being brought in from main memory 25 to second level cache 23. This eliminates the necessity of waiting for line Q to be written into second level cache 23 before the first four-word fragment of line Q may be read out of second level cache 23 and written into first level cache 24. In many systems, the bypass path could require additional data path logic. However, in the preferred embodiment of the present invention, cache control logic 22 handles both first level cache 24 and the second level/main memory 25 interface, eliminating the need for additional data path logic.

Figure 9:
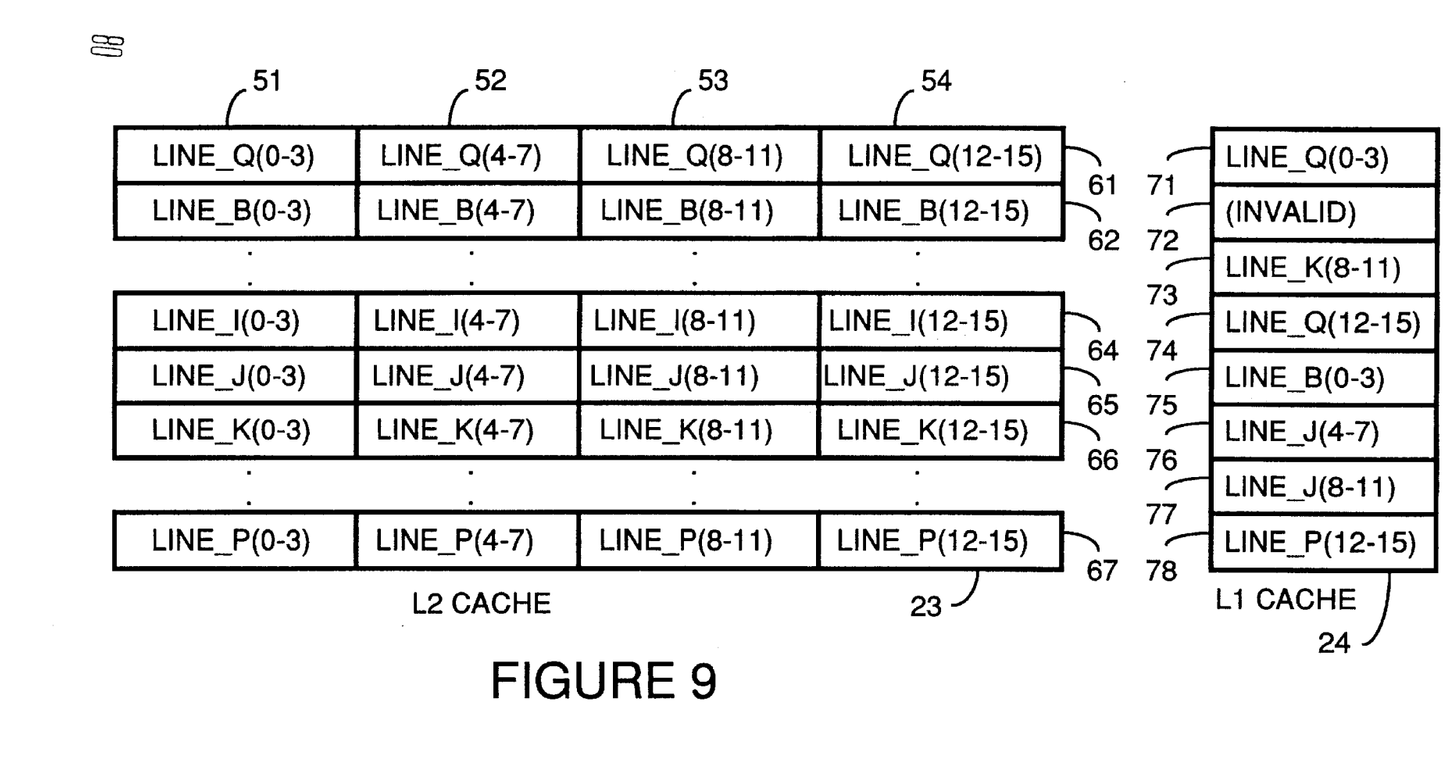
Figure 10:
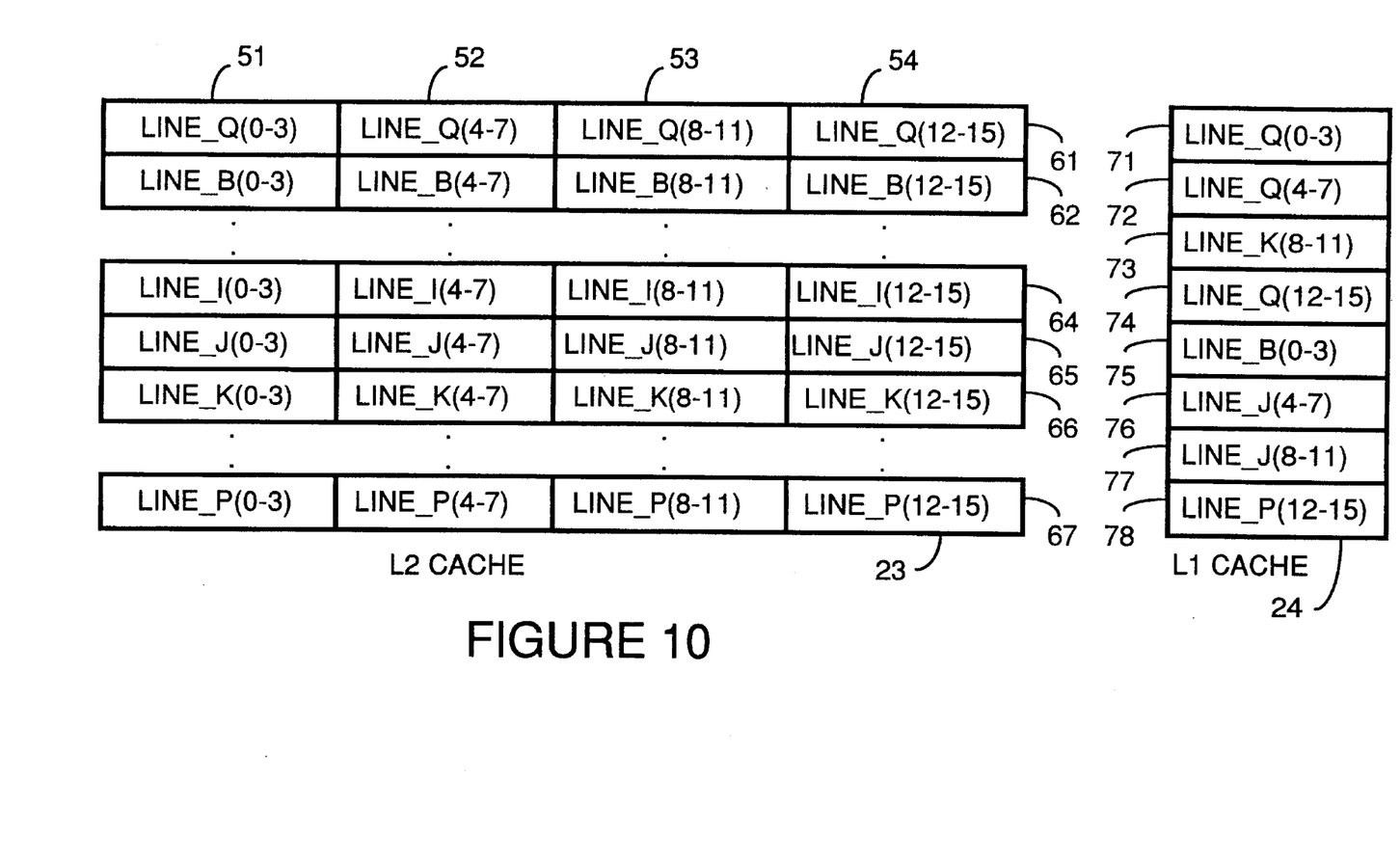

In an additional improvement to the above methods, cache controller 22 can remember the first level cache entries that were invalidated by the departing line A. When line Q is being brought in from main memory 25, four word fragments are written to first level cache entry 71 and first level cache entry 74 of first level cache 24. The result is shown in FIG. 9. The advantage of this improvement is that a subsequent access to the fourth four-word fragment of line Q will hit first level cache 24. Subsequent accesses to the second or third four-word fragments of line Q will still require a second level-to-first level move up.

In the preferred embodiment of the present invention, the above methods are improved again. In this case, in addition to remembering which first level cache entries were vacated by line A fragments, a check is also made for relevant first level cache entries that might already by invalid for other reasons. When line Q is being brought in from main memory 25, as many of the four-word fragments of line Q as possible are written into first level cache 24. The result can be seen in FIG. 10. This "bootleg first level cache fill" is made feasible by the specific system topology shown in FIG. 1. The fact that data being written from main memory 25 to second level cache 23 passes right through cache control logic 22 makes it possible to perform this preferred method without the addition of significant data path hardware.

Figure 11:
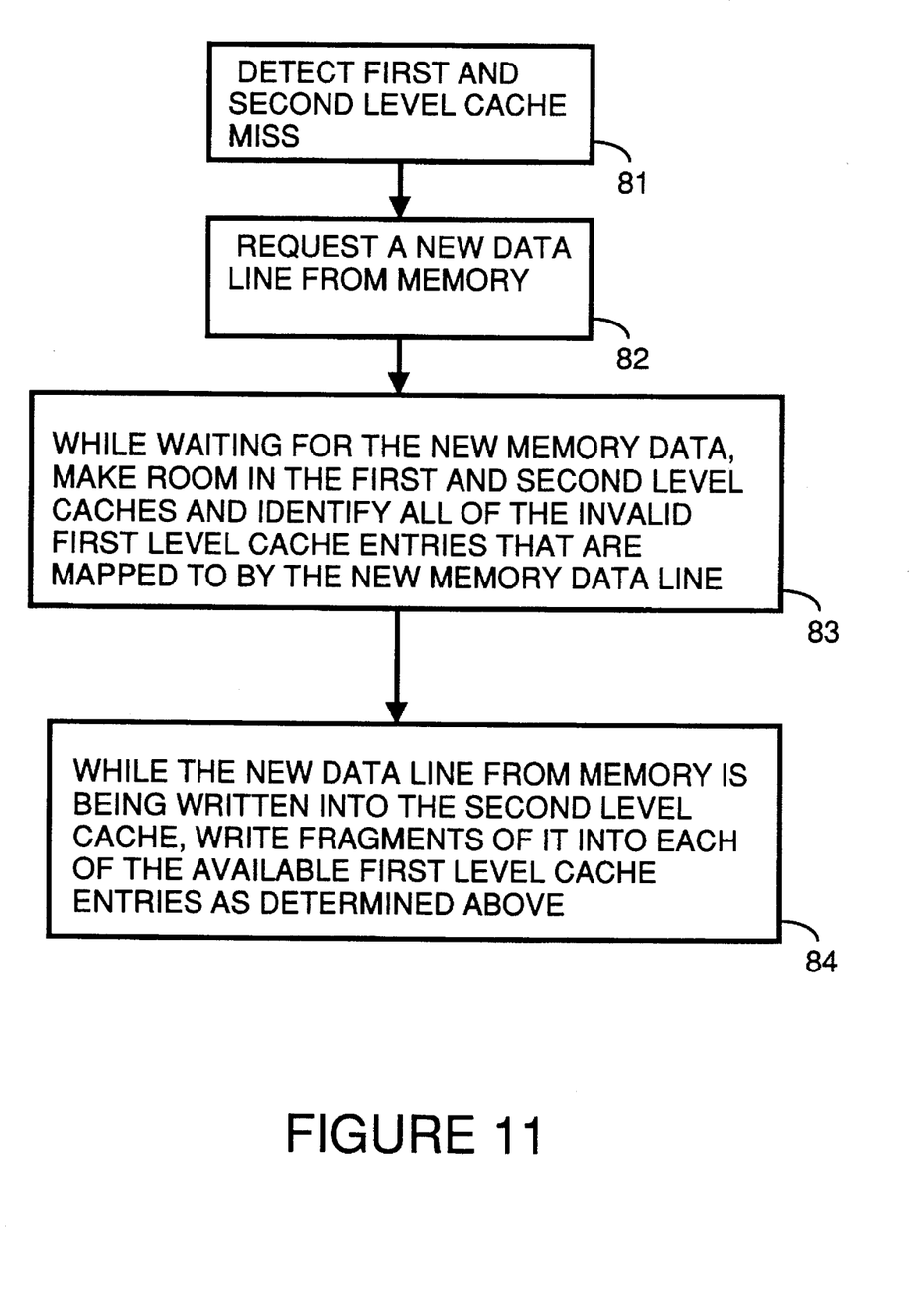
FIG. 11 is a flow chart which illustrates a method for filling a first level cache after a miss in the second level cache in accordance with the preferred embodiment of the present invention.

FIG. 11 summarizes operation of a method in accordance with the preferred embodiment of the present invention. The method involves opportunistically filling first level cache entries even though the locations being filled have not been requested. In a method step 81, a normal first level cache miss occurs. Second level cache 23 is checked. Second level cache 23 misses, and a main memory 25 reference is initiated. In a method step 82, a new data line is requested from memory.

In a method step 83, while waiting for the new memory data various actions take place, the necessary first level cache entry is invalidated to make room in the first level cache. Data is written back to the second level cache if the first level victim cacheline is dirty. Also, the necessary second level cache entry and any first level cache entries that contain fragments of the second level victim cacheline are invalidated to make room in the second level cache. Data is written back to memory if any part of the second level victim cacheline is dirty. Additionally, all of the invalid first level cache entries that are mapped to by the new memory data line are identified.

In a method step 84, while the new data line from memory is being written into the second level cache, fragments of it are written into each of the available first level cache entries as determined above. Using this method results in few first level cache entries remaining invalid over time. A maximum of three extra first level cache entries can be filled with no extra penalty.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. In a computing system which includes a processor, a main memory, a first level cache and a second level cache, the second level cache containing data lines, and each valid entry within the first level cache containing a data line fragment of a data line within the second level cache, each data line fragment contained within the first level cache including a fragment, but not all, of a data line contained within the second level cache, a method which is performed when a first level cache miss and a second level cache miss results from a cache reference of a data word made by the processor, the method comprising the steps of:

(a) fetching a new data line from the main memory;

(b) while waiting for the new data line fetched in step (a) to arrive from the main memory, determining which entries of rile first level cache are invalid; and, (c) when the new data line arrives from the main memory, placing into the first level cache a data line fragment which includes the data word, end in addition placing into the first level cache at least one additional data line fragment which replaces an entry determined in step (b) to be invalid;

wherein concurrent with step (c) the new data line is placed in the second level cache, replacing a second level victim cache line within the second level cache.

2. A method as in claim 1 wherein in step (b) invalid entries include entries of the first level cache which are marked invalid and entries within the first level cache which contain cache line fragments from the second level victim cache line within the second level cache.

3. A method as in claim 1 wherein each second level cache line contains sixteen words and each first level cache line fragment contains four words.

4. A method as in claim 1 wherein in step (b) invalid entries include entries of the first level cache which are marked invalid and entries within the first level cache which contain cache line fragments from a second level victim cache line within the second level cache.

5. A computing system comprising;

a processor;

a main memory;

a first level cache;

a second level cache, the second level cache containing data lines and valid entries within the first level cache each containing a data line fragment of a dam line within the second level cache, each data line fragment contained within the first level cache including a fragment, but not all, of a data line contained within the second level cache; and, a cache controller, coupled to the processor, the main memory, the first level cache and the second level cache, the cache controller fetching a new dam line from the main memory when a first level cache miss and a second level cache miss results from a cache reference of a data word made by the processor, determining which entries of the first level cache are invalid, and placing into the first level cache a data line fragment which includes the data word and in addition replacing as many data line fragments as possible from the new data line into invalid entries in the first level cache when the new data line arrives from the main memory;

wherein the cache controller additionally replaces a second level victim cache line within the second level cache concurrent with the cache controller placing as many data line fragments as possible from the new data line into invalid entries in the first level cache.

6. A computing system as in claim 5 wherein invalid entries as determined by the cache controller include entries of the first level cache which are marked invalid and entries within the first level cache which contain cache line fragments from the second level victim cache line within the second level cache.

7. A computing system as in claim 5 wherein each second level cache line contains sixteen words and each first level cache line fragment contains four words.

8. A computing system as in claim 5 wherein invalid entries as determined by the cache controller include entries of the first level cache which are marked invalid and entries within the first level cache which contain cache line fragments from a second level victim cache line within the second level cache.

9. In a computing system which includes a processor, a main memory, a first level cache and a second level cache, the second level cache containing data lines and the first level cache containing within valid entries data line fragments of data lines within the second level cache, each data line fragment contained within the first level cache including a fragment, but not all, of a data line contained within the second level cache, a method comprising the steps of:

(a) in response to a processor attempt to access a data word, searching for the data word in the first level cache;

(b) when a first level cache miss results from performance of step (a), searching for the data word in the second level cache; and, (c) when a second level cache miss results from the performance of step (b), performing the following substeps:

(c.1) fetching a new data line from the main memory, the new data line containing the data word, (c.2) while waiting for the new data line fetched in substep (c.1) to arrive from the main memory, determining which entries of the first level cache are invalid, and (c.3) when the new data line is fetched from the main memory, placing as many data line fragments as possible from the new data line into invalid entries in the first level cache, one data line fragment from the new data line placed into the first level cache including the data word;

wherein concurrent with substep (c.3) the new data line is placed in the second level cache, replacing a second level victim cache line within the second level cache.

10. A method as in claim 9 wherein in substep (c.2) invalid entries include entries of the first level cache which are marked invalid and entries within the first level cache which contain cache line fragments from the second level victim cache line within the second level cache.

11. A method as in claim 9 wherein each second level cache line contains sixteen words and each first level cache line fragment contains four words.

12. A method as in claim 9 wherein in substep (c.2) invalid entries include entries of the first level cache which are marked invalid and entries within the first level cache which contain cache line fragments from a second level victim cache line within the second level cache.

* * * * *

UNITED STATES PATENT AND TRADEMARK OFFICE
CERTIFICATE OF CORRECTION

PATENT NO. : 5,577,227
DATED : November 19, 1996
INVENTOR(S) : Finnell et al.

It is certified that error appears in the above-identified patent and that said Letters Patent is hereby corrected as shown below:

Column 5,
Line 63, delete "For a lead instruction, CPU 21 obtains the lead" and insert therefor -- For a load instruction, CPU 21 obtains the load --

Column 8,
Line 53, delete "rile" and insert therefor -- the --
Line 56, delete "end" and insert therefor -- and --

Column 9,
Lines 16 and 24, delete "dam" and insert therefor -- data --
Line 32, delete "replacing" and insert therefor -- placing --

Signed and Sealed this

Twenty-second Day of July, 2003

JAMES E. ROGAN
*Director of the United States Patent and Trademark Office*